(12) United States Patent
Tandon et al.

(10) Patent No.: US 10,645,230 B1
(45) Date of Patent: May 5, 2020

(54) ROAMING CELLULAR TRAFFIC POLICY AND CHARGING NEGOTIATION AND ENFORCEMENT ENTITY

(71) Applicant: Syniverse Technologies, LLC, Tampa, FL (US)

(72) Inventors: Ravi Tandon, Sandweiler (LU);
Huiyue Xu, Tampa, FL (US);
Himanshu Garg, Bathinda (IN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/709,218

(22) Filed: Dec. 10, 2019

Related U.S. Application Data

(60) Provisional application No. 62/926,944, filed on Oct. 28, 2019.

(51) Int. Cl.
| | |
|---|---|
| *H04W 4/70* | (2018.01) |
| *H04W 8/26* | (2009.01) |
| *H04W 76/12* | (2018.01) |
| *H04M 15/00* | (2006.01) |
| *H04W 84/04* | (2009.01) |

(52) U.S. Cl.
CPC .......... *H04M 15/66* (2013.01); *H04M 15/46* (2013.01); *H04W 76/12* (2018.02); *H04M 2215/34* (2013.01); *H04W 84/042* (2013.01)

(58) Field of Classification Search
CPC ........ H04W 4/70; H04W 76/12; H04W 8/26; H04L 5/0053; H04L 12/1407; H04L 41/0816

USPC ........................ 379/32.01; 709/223; 370/230
See application file for complete search history.

(56) References Cited

U.S. PATENT DOCUMENTS

| | | | | |
|---|---|---|---|---|
| 7,436,766 | B2 * | 10/2008 | Alfano | H04L 12/2803 370/230 |
| 9,444,692 | B2 * | 9/2016 | Lehane | H04L 41/0816 |
| 9,832,678 | B1 * | 11/2017 | Tandon | H04W 76/12 |
| 10,264,409 | B1 * | 4/2019 | Xu | H04L 63/0876 |
| 10,292,190 | B2 * | 5/2019 | Xu | H04W 8/26 |
| 10,412,049 | B2 * | 9/2019 | Xu | H04L 65/1033 |
| 10,506,422 | B1 * | 12/2019 | Tandon | H04W 76/12 |
| 2006/0250956 | A1 * | 11/2006 | Alfano | H04L 12/2803 370/230 |

(Continued)

*Primary Examiner* — William D Cumming
(74) *Attorney, Agent, or Firm* — Anton J. Hopen; Smith & Hopen, P.A.

(57) ABSTRACT

A virtualized Policy, Charging, Negotiation and Enforcement Entity (PCNE) is disclosed for serving cellular traffic across multiple networks. The PCNE manages signaling and user payloads to apply policies compliant to concerned networks in real time. The PCNE provides policy control to a Home network even when its outbound subscriber traffic is locally offloaded at a Visited network or IP Packet Exchange (IPX) cloud. The PCNE protects the Visited network against capacity overuse by inbound subscriber traffic, thereby providing joint control to the Home and Visited network operators resulting in optimal use of bandwidth and resources along with consistent subscriber experience. The PCNE enables the Home network operator to implement domestic quota buckets and policies while its subscriber is roaming in the Visited network by applying differential policy and charging rules. Traffic can be offloaded to a preferred packet data gateway after enforcing the negotiated policies.

19 Claims, 9 Drawing Sheets

(56) References Cited

U.S. PATENT DOCUMENTS

| | | | | |
|---|---|---|---|---|
| 2012/0275573 A1* | 11/2012 | Lehane | .............. | H04L 12/1407 |
| | | | | 379/32.01 |
| 2012/0278464 A1* | 11/2012 | Lehane | .............. | H04L 12/1407 |
| | | | | 709/223 |
| 2017/0318570 A1* | 11/2017 | Shaw | ................... | H04L 5/0053 |
| 2018/0006954 A1* | 1/2018 | Arora | ..................... | H04W 4/70 |

* cited by examiner

Network interfaces of PCNE Entity for home routed scenarios.

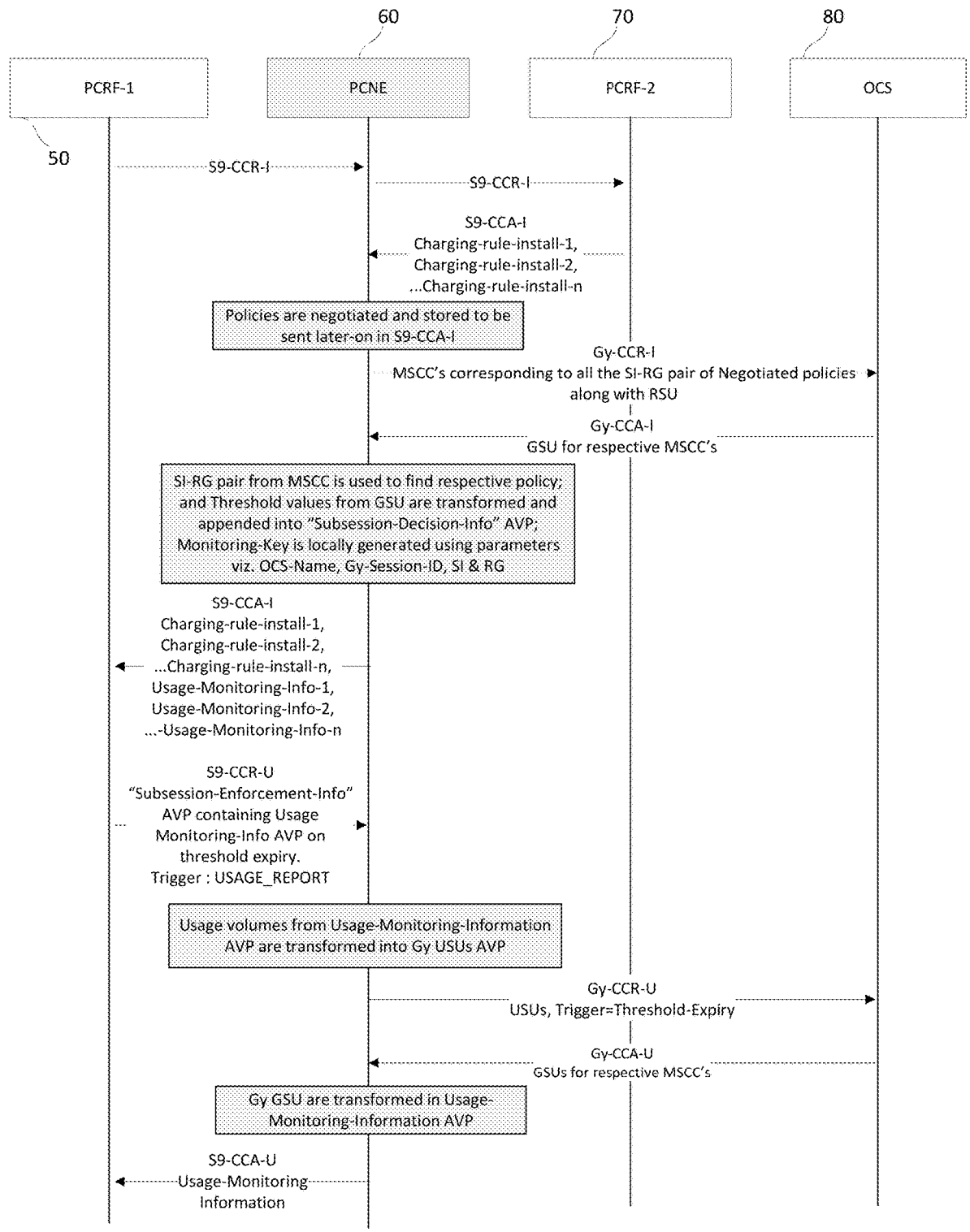

ROAMING CELLULAR TRAFFIC POLICY AND CHARGING NEGOTIATION AND ENFORCEMENT ENTITY

PRIORITY CLAIM

This non-provisional application claims priority to a U.S. Provisional Application having Ser. No. 62/926,944 filed on Oct. 28, 2019 under the same title.

BACKGROUND OF THE INVENTION

1. Field of the Invention

This invention relates generally to the field of Internet Protocol (IP) and telecommunications networks, specifically to the signaling and data traffic by the cellular devices.

More specifically, the invention relates to methods and systems of negotiating policy and charging rules in scenarios where policies are imported from multiple nodes including Policy and Charging Rules Function (PCRF) and Online Charging Systems (OCS) nodes to efficiently utilize the bandwidth and resources and to provide consistent subscriber experience.

2. Brief Description of the Related Art

The existing policy and charging systems are inefficient in applying various policies when multiple cellular networks are involved such as in roaming scenarios. Existing systems lack granularity of implementing correct policy rules on traffic, which result in inconsistent subscriber experiences, conflicting priorities, and inefficient utilization of bandwidth and resources. Another problem associated with the existing policy and charging systems is absence of joint control by concerned operators or optimal policy set depending upon visited country, visited network, zone, profile and pack subscription.

Mobile roaming refers to a scenario in which a mobile subscriber of a Home Public Land Mobile Network (HPLMN) operator is using mobile service in a foreign location, in which the mobile service is provided by a Visited Public Land Mobile Network (VPLMN).

Currently in mobile roaming, there exists two models for mobile devices to access packet data network (PDN), namely Visited Access also called as 'Local breakout,' in which user traffic is routed to internet directly from VPLMN, and 'Home routed,' in which user traffic is routed to HPLMN before reaching the Internet. Home-routed model is widely accepted because the home network operator has greater control over the service quality and subscriber experience. Although the Visited Access model—in which the subscriber's data is serviced by the network the subscriber is visiting—delivers more efficient routing in terms of bandwidth and latency, this model is not widely used because Home operator loses control of their subscribers with minimal or no role in delivering services to them. Thus, although the Visited Access model is more efficient than the Home-routed model, the Visited Access model did not gain traction due to lack of mutual trust among operators and unavailability of trusted systems and methods to provide transparent policy and charging control to both Visited and Home Operators in real-time.

Therefore, there is a need in the art for a method and system of providing policy, charging, negotiation, and enforcement functions in a seamless manner to enhance subscriber experience and optimize bandwidth and resource utilization while adhering to terms and conditions of the agreement among concerned operators.

SUMMARY OF INVENTION

The invention includes a method and system for negotiating and enforcing policies and charging for cellular traffic across multiple networks, particularly between a subscriber's home network and a visiting network the subscriber is roaming on. Policies are normalized between three sources: (1) the home network operator; (2) the visiting network operator; and (3) a static policy database which may override conflicting and/or inefficient policies of the former. From the three policy sources a single negotiated policy is derived and applied to subscriber traffic. To implement this, Gy attributes received from a first network and transformed into S9 attributes and directed towards a second network to apply online charging system (OCS) based charging policies for the first network when the single negotiated policy is enforced on real-time subscriber traffic. The static policy database stores local policies and priorities related to subscribers and operators. In an embodiment of the invention, this database may also be locally configured to modify policies. The static policy database stores local policies based on parameters selected from the group consisting of IMSI-prefix, MSISDN-prefix, VPLMN, APN, serving network, current user location information, zone, preferred roaming partner, access type, order, priority, and applicability and conflict-resolution schemes. A conflict resolver module may be provided to resolve the conflict among contradictory polices received from the first network, the second networks, and a static policy database using conflict resolution techniques defined in the static policy database or a subscriber and operator profile.

A general packet radio service (GPRS) tunneling protocol control plane (GTP-C) module is used to validate and forward GPRS tunneling protocol (GTP) signaling messages. Similarly, a GPRS tunneling protocol user plane (GTP-U) module is used to validate and forward GTP user data. In an embodiment of the invention, the GTP-C module is used to enforce the policies onto GTP signaling traffic and steer the traffic towards a selected PGW, the GTP-C module being configured to decide whether to handle GTP user traffic or to create a direct tunnel between serving gateway (SGW) and the PGW wherein a GTP-U module is used to handle GTP user traffic and apply negotiated subscriber policies to mirror, steer, block or redirect the GTP user traffic. Gx, Gy and S9 modules are used to manage their respective interface-related messages and attributes. The Gx, Gy and S9 modules further store session specific information on their respective interfaces.

For a Visited-access roaming model, a Gy to S9 transformer module is used to transform charging policies received over Gy interface from a home network OCS into S9 charging policies to be communicated to visited policy charging rules function (PCRF). The charging policies are applied to inbound roaming traffic in real-time by a visited packet data network gateway (PGW). In an embodiment of the invention, the Gy to S9 transformer module is used to maintain inter-mapping between Gy and S9 attributes to apprehend, modify, and transform policies and attributes in real-time.

For a Home-routed access roaming model, the Gx module is used to retrieve polices over Gx interface from a visited PCRF system, and a S9 module is used to retrieve policies from a home PCRF system, wherein policies obtained from both the visited PCRF system and the home PCRF system are communicated to a policy negotiator module to derive the single negotiated policy. The policy negotiator module is used to process and negotiate policies received from the visited PCRF system and the home PCRF System to establish the single negotiated policy to prevent overuse and enforce roaming agreements. In an embodiment of the invention, a policy enforcer module is used to enforce the single negotiated policy onto signaling and user traffic to optimize bandwidth and resources of the visited network and the home network, whereby a visited network operator and a home network operator have joint control over roaming policies and restrictions.

In an embodiment of the invention, a home network implements domestic quota buckets while a subscriber is roaming in a visited network by applying differential policy and charging based on parameters selected from the group consisting of visited country, visited network, zone, international mobile subscriber identity (IMSI) prefix, mobile station international subscriber directory number (MSISDN) prefix, user profile and access point name (APN).

BRIEF DESCRIPTION OF THE DRAWINGS

For a fuller understanding of the invention, reference should be made to the following detailed disclosure, taken in connection with the accompanying drawings, in which:

FIG. 9 is a diagram schematically depicting Gy to S9 AVP transformation via the PCNE.

DETAILED DESCRIPTION OF THE INVENTION

This invention pertains to a method and system for negotiating and enforcing policy, charging, and proxy rules on the subscriber traffic via cloud hosted virtualized node called Policy and Charging Negotiation and Enforcement Entity (PCNE) on both signaling and user traffic in such a manner that the rules are compliant to policies of the operators involved in the call flow. For example, in a roaming scenario the method and system may be configured to provide seamless control to Visited as well as Home network operators. In some embodiments, the invention may be configured to perform the following functions: handling of inbound and outbound Roaming Traffic to provide joint control to Visited network and Home network by adhering to agreed roaming agreement policies in real-time. The disclosed method and system can also pertain to scenarios in which differential policies are needed to be implemented on subscriber traffic depending upon location, zone, profile and segment of subscribers.

The disclosed method and system may be configured to protect Visited Network against capacity overuse in real-time, depending upon the policies configured based on roaming agreements. The disclosed method and system can also enable Home network to implement domestic quota buckets while the subscriber is roaming in a different network by applying differential policy and charging based on visited country, visited network, zone, IMSI prefix, MSISDN Prefix, Profile and Access Point Name (APN) being used by the subscriber.

In an embodiment, the invention functions as a policy aggregator, such that the peer networks can save or implement or refer roaming policies as per their roaming agreements such that a centralized policy store ensures that Quality of Service (QoS) related functions—such as, QoS Class Identifier (QCI), Allocation and Retention Priority (ARP), Access Point Name Aggregate Maximum Bit Rate (APN-AMBR), Guaranteed Bit Rate (GBR) parameters, packet filters, and downgrading function—are properly implemented to support required QoS as agreed commercially between the HPMN and VPMN.

Figure 1:
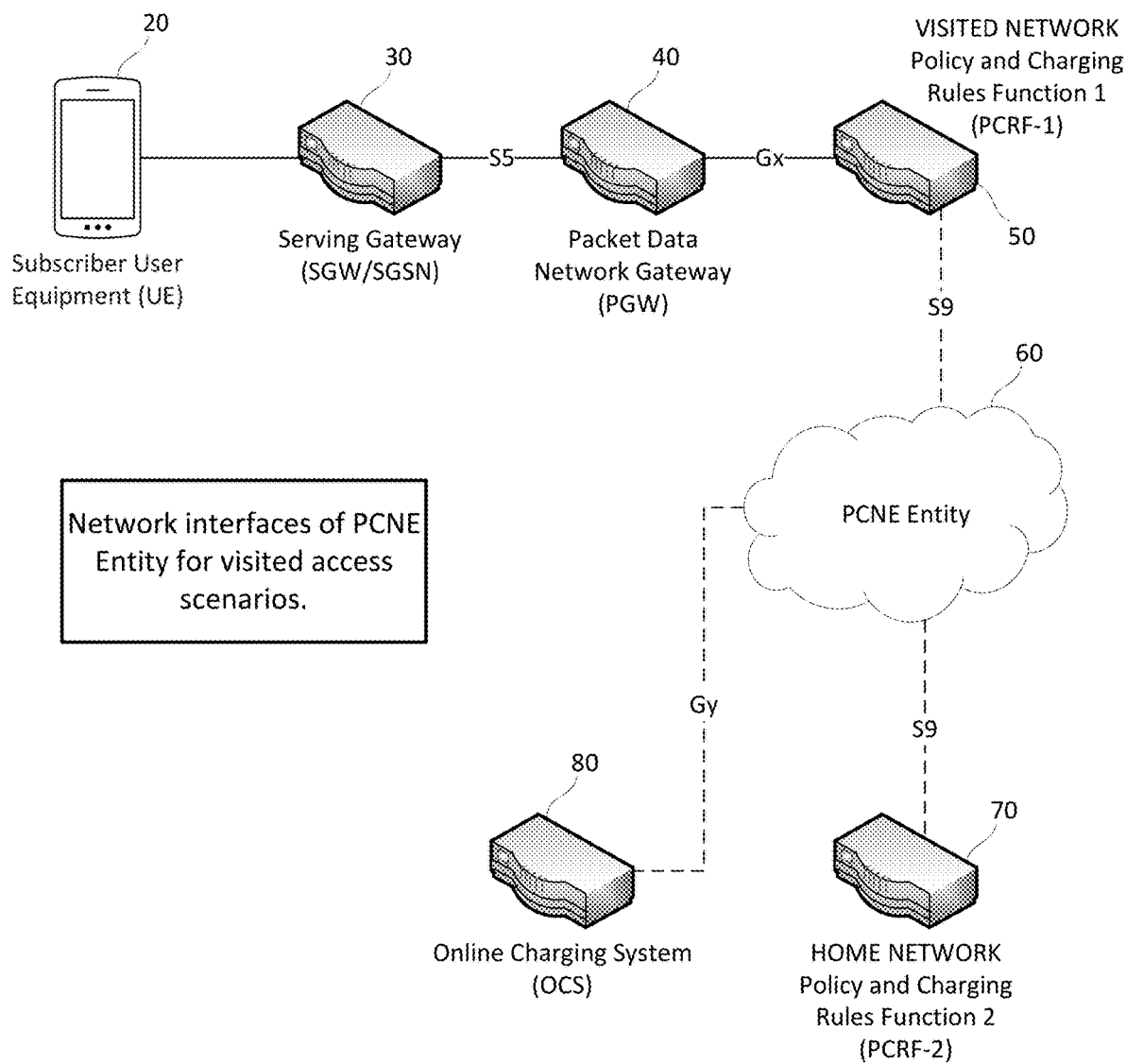
FIG. 1 is a diagram schematically depicting the Network interfaces of the PCNE for Visited Access scenarios.

In an embodiment depicted in FIG. 1, PCNE Entity 60 is configured to establish S9 interfaces with V-PCRF 50 and H-PCRF 70. When visited PGW 40 queries V-PCRF 50 for policies related to the subscriber 20, V-PCRF 50 can obtain them directly from PCNE Entity 60 without having dedicated S9 connections with home operators. PCNE Entity 60 can also retrieve policies from H-PCRF 70, evaluate the policies based on roaming-agreements and static-policies configured in PCNE Entity 60 itself, to provide negotiated policy to V-PCRF 50. PCNE Entity 60 may pull through a Gy interface charging rules from Home Network Online Charging System (OCS) 80 and transform them into S9 charging rules to be delivered to PCRF-1 50 such that the Home charging rules can be applied even when a subscriber 20 is roaming (see FIG. 9).

Figure 2:
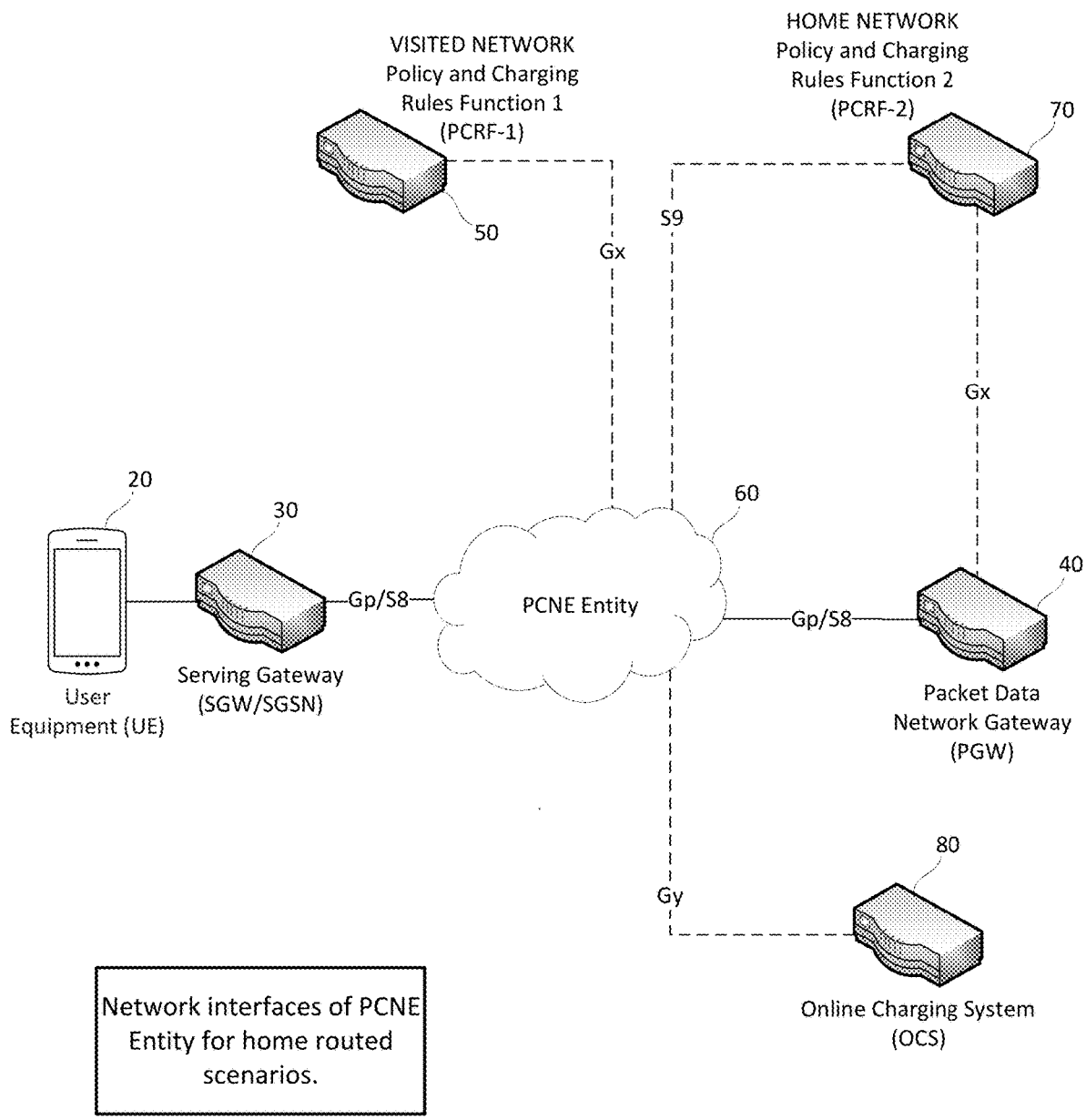
FIG. 2 is a diagram schematically depicting the Network interfaces of the PCNE for Home Routed scenarios.

In an embodiment depicted in FIG. 2, PCNE Entity 60 is configured to establish a Gx-interface with V-PCRF 50 and an S9 interface with H-PCRF 70 to retrieve both VPLMN and HPLMN specific policies in real-time. PCNE Entity 60 evaluates both policies along with any static-policies configured in PCNE Entity 60 and applies a single negotiated policy onto GTP-traffic exchanged with PGW 40 and SGW 30.

Figure 3:
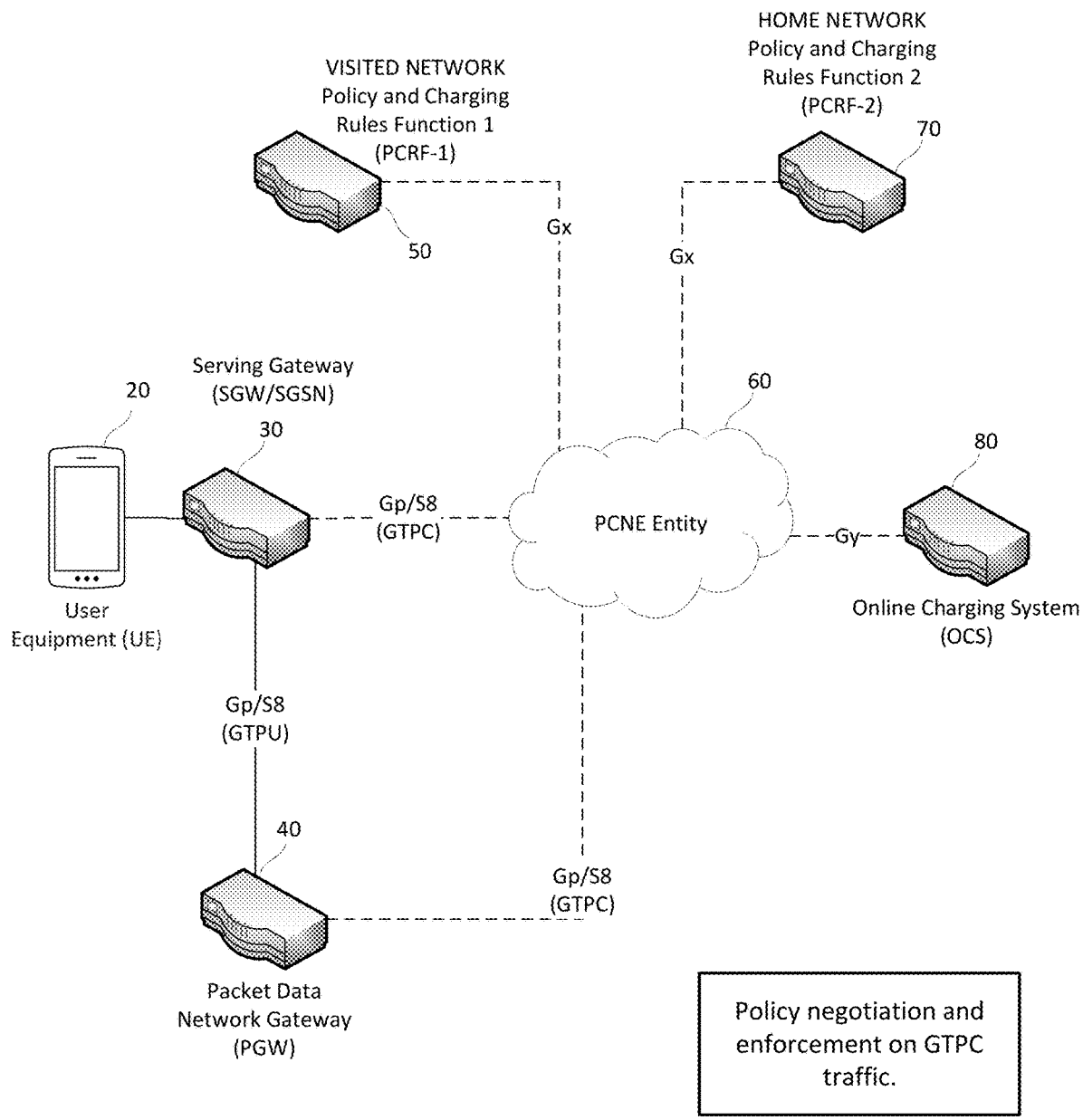
FIG. 3 is a diagram schematically depicting the Policy negotiation and enforcement on GTPC traffic.
Figure 4:
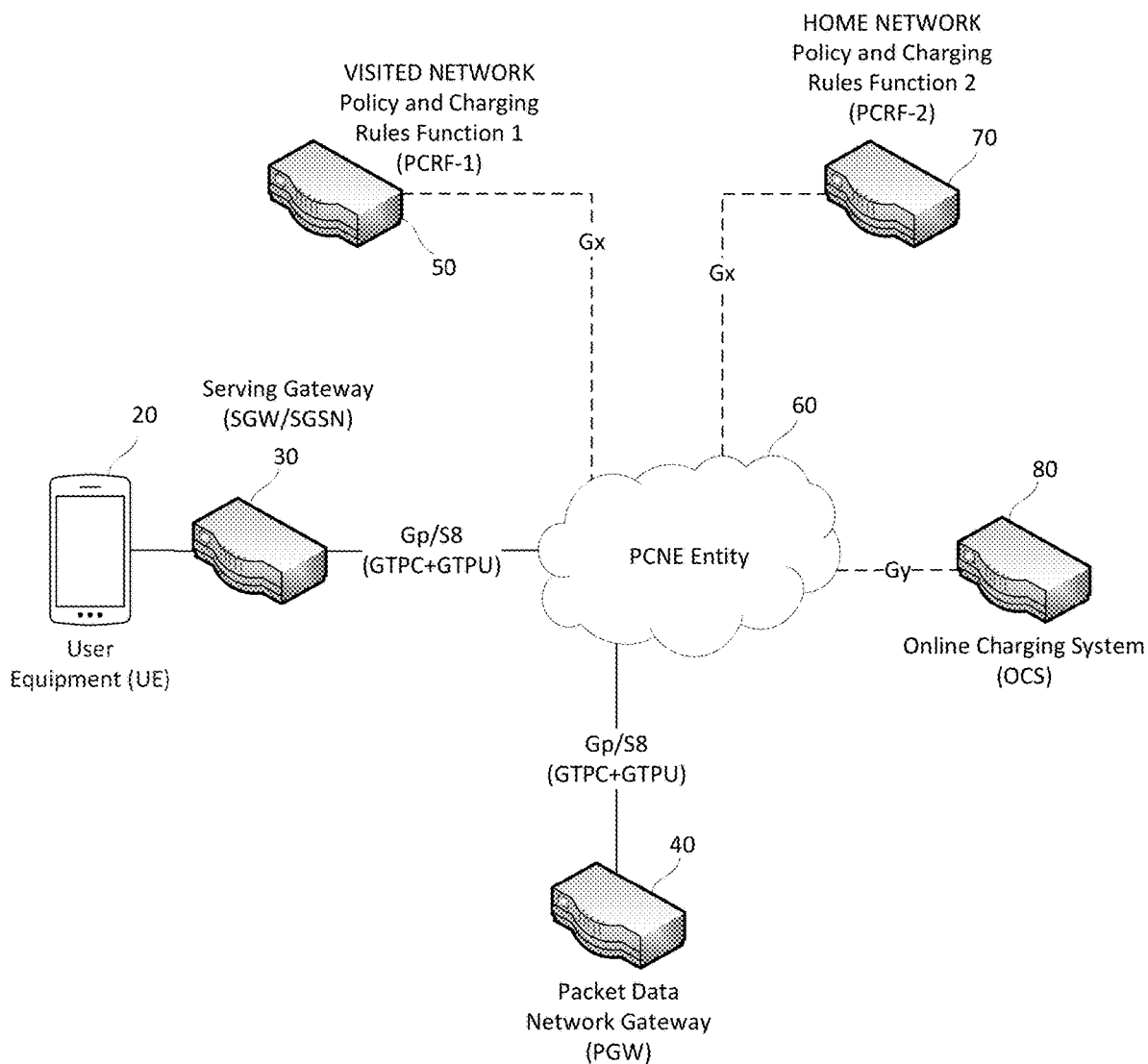
FIG. 4 is a diagram schematically depicting Policy negotiation and enforcement on GTPC and GTPU traffic.

In embodiments depicted in FIGS. 3 and 4, PCNE Entity 60 is configured to open Gx-interfaces with V-PCRF 50 and H-PCRF 70 to retrieve both VPLMN and HPLMN specific policies in real-time. PCNE Entity 60 evaluates both policies along with any locally configured static-policies in PCNE Entity 60 and applies a single negotiated policy onto GTP-traffic exchanged with PGW 40 and SGW 30. In addition, PCNE Entity 60 can establish Gy interface with OCS 80 and perform online-charging.

Figure 5:
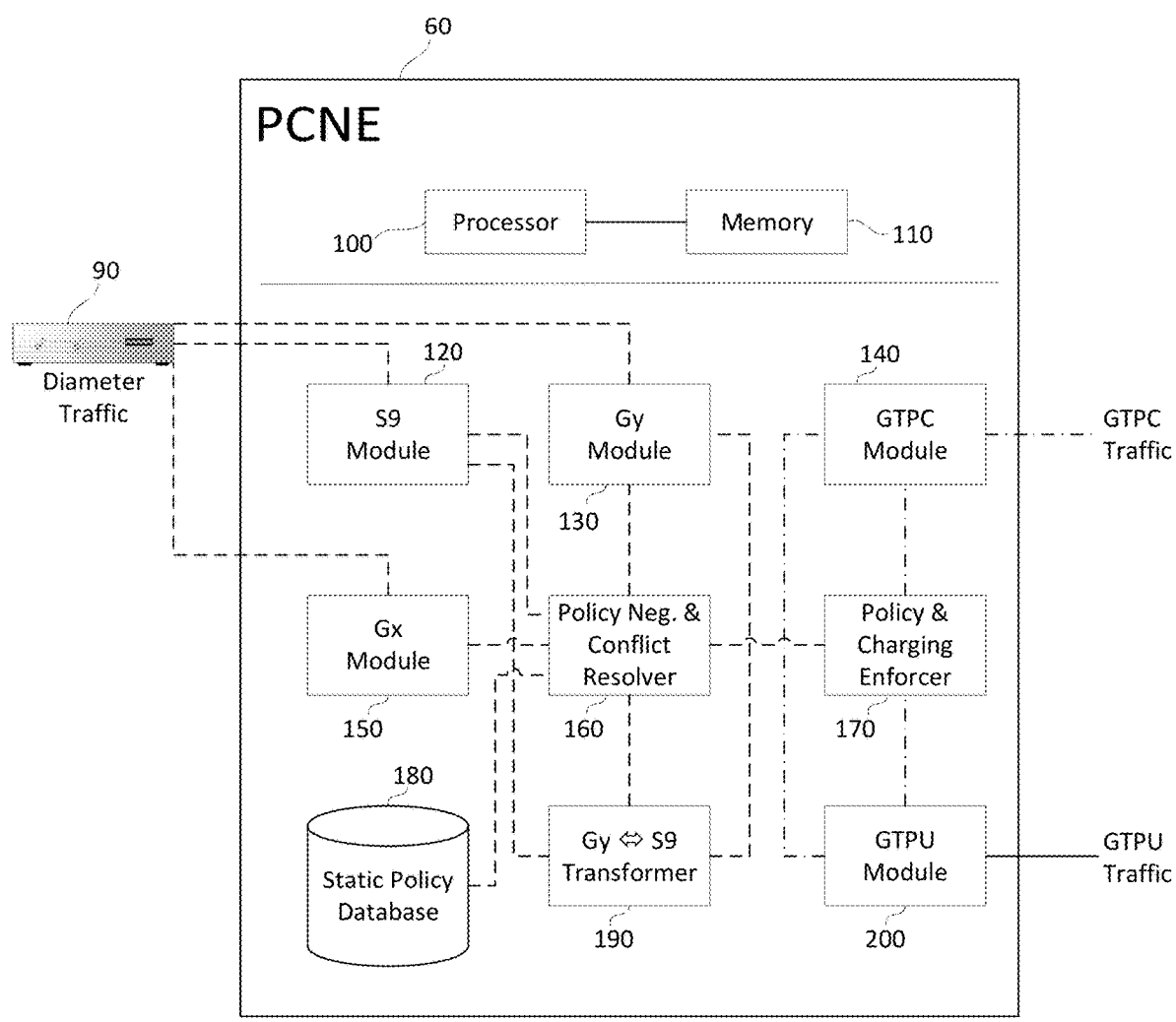
FIG. 5 is a diagram schematically depicting the internal components of the PCNE.

FIG. 5 depicts various components of PCNE Entity 60. These components include a processor 100 in communication with a memory module 110. PCNE Entity 60 further includes S9 Module 120, Gy Module 130, and Gx module 150 for Diameter Traffic. Each of these modules communicates with a Policy Negotiator and Conflict Resolver Module 160. The S9 module 120 and Gy module 130 also communicate with Gy to S9 Transformer Module 190. A Static Policy Database module 180 contains static policy rules and is configured to communicate these rules to the Policy Negotiator & Conflict Resolver Module 160. Next, the Policy Negotiator & Conflict Resolver Module 160 communicates with Policy & Charging Enforcer Module 170, which, in turn, communicates with the GTP-C Module 140 for GTP-C traffic and GTP-U Module 200 for GTP-U traffic.

Figure 6:
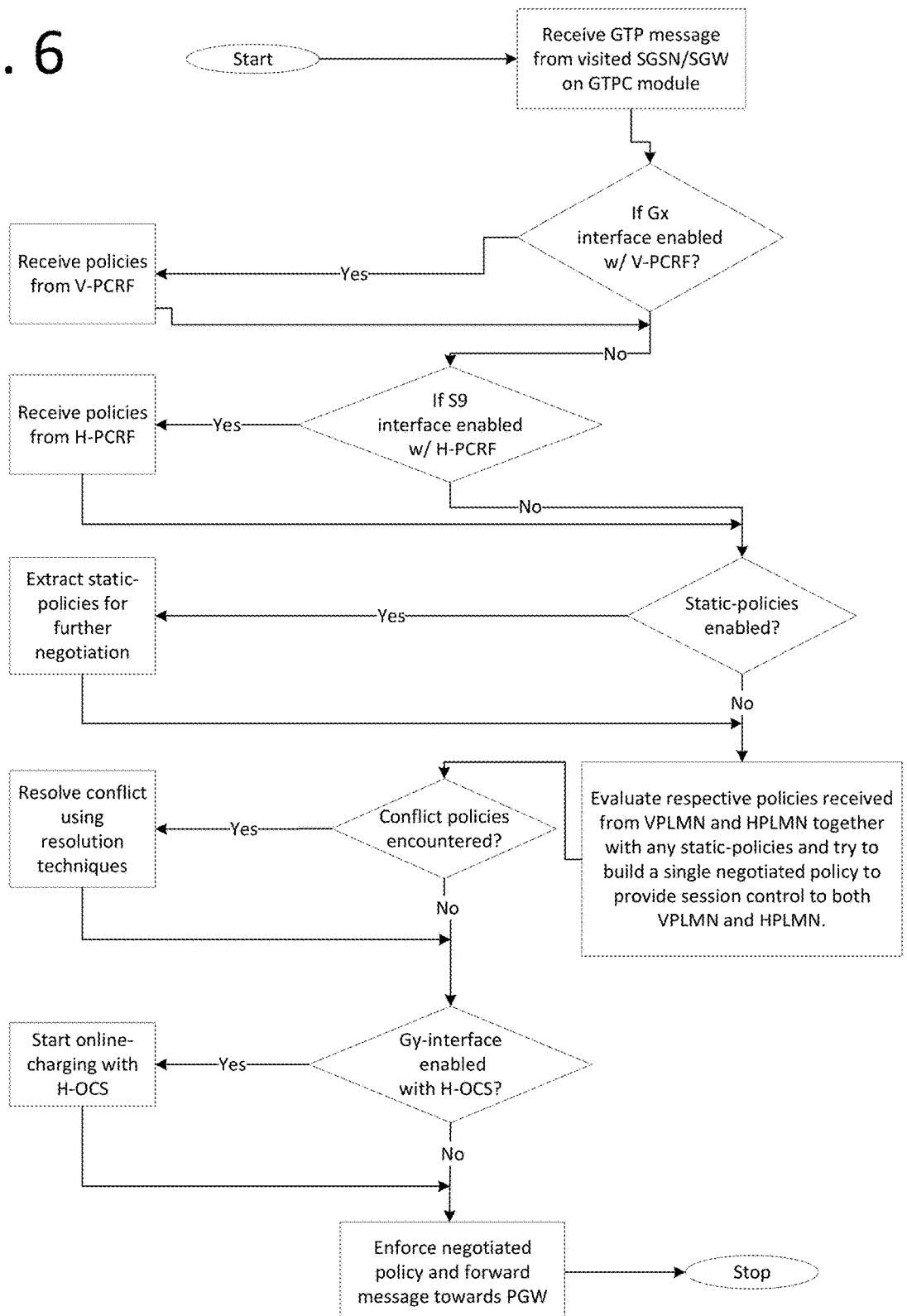
FIG. 6 is a diagram schematically depicting the flow chart for Home Routed Policy negotiation, conflict resolution and charging.
Figure 7:
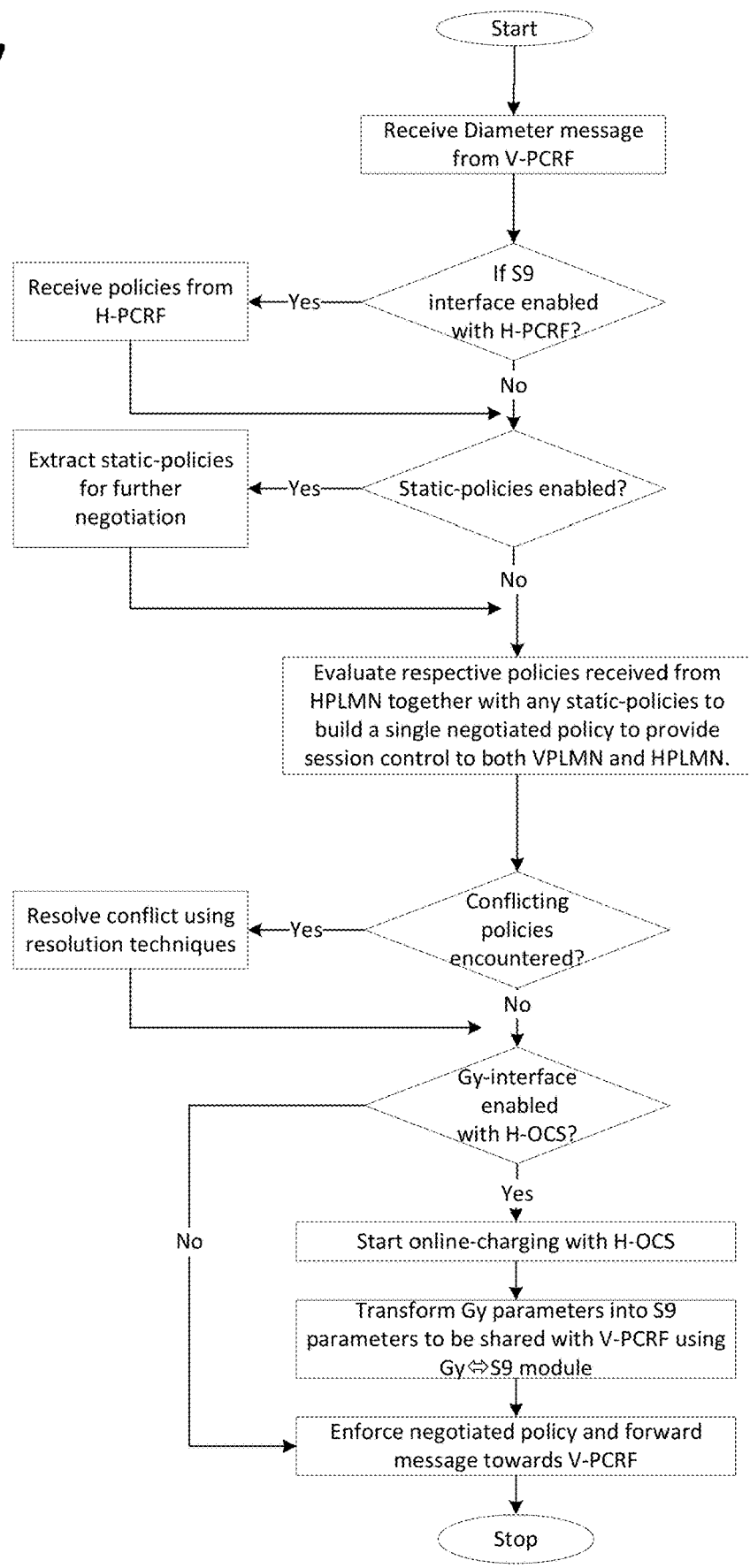
FIG. 7 is a diagram schematically depicting flow chart for Visited Access Policy negotiation, conflict resolution and charging.

FIGS. 6 and 7 provide exemplary methods of policy negotiation, conflict resolution, and charging for Home Routed and Visited Access models respectively. In FIG. 6, a GTP message is received from a visited SGSN/SGW on a GTPC module. If the Gx interface is enabled with a Visited PCRF then policies are received from the Visited PCRF. Then the process checks whether an S9 interface is enabled with a Home PCRF. If so, then the Home PCRF policies are received. Then process checks whether static policies are enabled. If static policies are enabled, they are extracted for further negotiation. Then the process evaluates respective policies if any received from the VPLMN and HPLMN together with any static policies to build a single negotiated policy to provide session control to both the VPLMN and the HPLMN. If a conflict is encountered, it is resolved using resolution techniques. The process also checks whether a Gy interface is enabled with Home Online Charging System (OCS). If it is enabled, then online charging is initiated with Home OCS. Finally, the process enforces the negotiated policy and forward the messages to the PGW.

FIG. 7 enumerates the process in a Visited Access model. A Diameter message is received from the Visited PCRF. If an S9 interface is enabled with the Home PCRF then policies are received from the Home PCRF. Next, the process checks whether static policies are enabled. If so, they are extracted for further negotiation. The process then evaluates the respective policies received from the HPLMN together with any static policies to build a single negotiated policy to provide session control to both the VPLMN and HPLMN. If conflicting policies are encountered, then they are resolved. The process then checks whether a Gy interface is enabled with Home OCS. If not, the process skips to enforcement of the negotiated policy and forwards messaging to the Visited PCRF. If Home OCS is enabled on the Gy interface, then Home OCS charging is started and Gy parameters are transformed into S9 parameters shared with the Visited PCRF using a Gy-to-S9 module.

Figure 8:
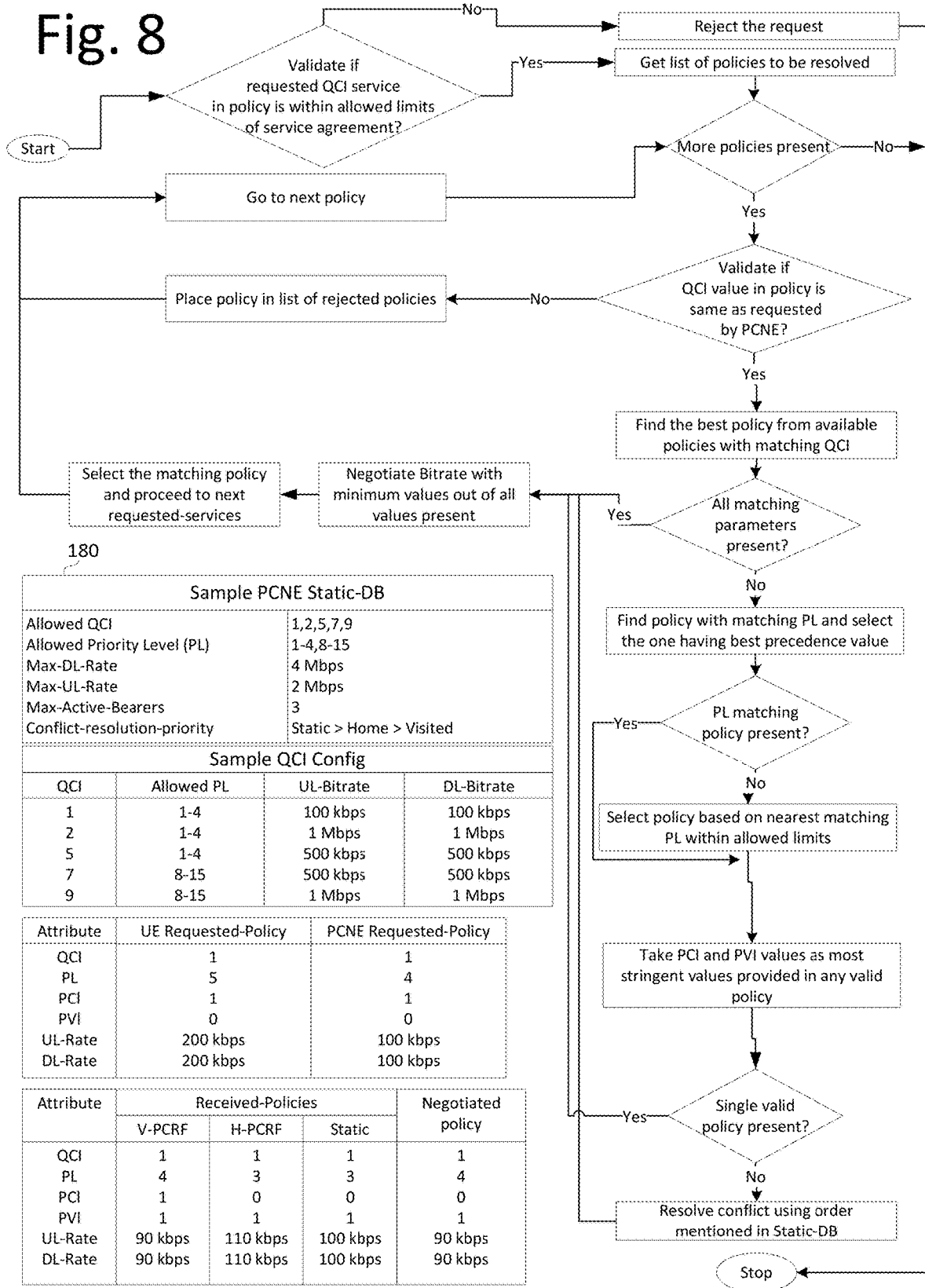
FIG. 8 is a diagram schematically depicting sample conflict resolution techniques employed by the PCNE.

FIG. 8 provides a sample conflict resolution technique used by PCNE Entity. A list of policies is obtained from multiple nodes involved in the call flow for resolution to get a final policy to be applied on traffic. A service agreement provides constraints to which each requested QCI service in the policy is permitted or rejected. In a 4G network, allocation and retention priority (ARP) priority level (PL) values range from 1 through 15, where 1 corresponds to the highest priority and 15 corresponds to the lowest priority. In a 3G network, ARP values range from 1 through 3, where 1 corresponds to the highest priority and 3 corresponds to the lowest priority. The more sensitive the QoS application, the lower the corresponding PL or ARP value.

The gateway uses ARP values to manage the allocation and retention of resources for bearers. When preemption is active the gateway evaluates the priority level and the preemption vulnerability (PVI) and preemption capability (PCI) flags in the GTPv2 packet header to determine whether a bearer is a candidate for deletion. Tables in FIG. 8 show one of the sample set of values for the static policy database 180 having values for allowed QCI (1, 2, 5, 7 and 9), allowed priority levels (1-4, 8-15), maximum download rate (4 Mbps), maximum upload rate (2 Mbps), maximum active bearers per UE (3) and conflict resolution priority wherein the static policy database 180 precedes the Home Network PCRF 70. The Home Network PCRF 70, in turn, precedes the Visiting Network PCRF 50.

In an embodiment of the invention, the PCNE Entity will only allow those QCI values that falls within permissible range of QCI values configured as per Roaming policies else corresponding request would be rejected. If requested QCI falls within the permissible range then it would resolve the policies received from V-PCRF, H-PCRF and local DB to come out with single policy. In the case where the parameters do not match up, the PCNE Entity finds the policy with matching PL and selects the one having the best precedence value. The PCNE Entity further selects the policy value based on the nearest matching PL within allowed limits. PCI (Pre-emption capability) and PVI (Pre-emption vulnerability) is selected as the most stringent values supplied in any of the valid policies being used for negotiation. Uplink and Downlink data-rates are taken as minimum of values 1) Requested by UE; 2) QCI-level maximum values configured in Static-policy database; 3) Values provided by V-PCRF; 4) Values provided by H-PCRF and 5) Values provided by static policy rules configured.

FIG. 9 provides a signaling flow diagram for Gy to S9 transformation performed by PCNE Entity 60. From the Visited network PCFR 50 to the PCNE 60 an initial CCR-I request is made over an S9 interface. The CCR-I request is further sent from PCNE 60 to Home network PCRF 70 over S9. Home network PCRF 70 responds back to PCNE 60 with a CCA-I over S9 with charging rule policies. PCNE 60 then negotiates the policies and stores them to be later sent on S9-CCA-I. Over a Gy interface, CCR-I is sent from PCNE 60 to OCS 80 including multiple services credit control (MSCC's) corresponding to all the Service Identifier-Rating Group pair (SI-RG pair) of negotiated policies along with Requested Service Units (RSU). OCS 80 responds back to PCNE 60 with a CCA for with Granted service Units (GSU) for respective MSCC's over the Gy interface.

The PCNE 60 then uses the SI-RG pair from MSCC to find respective policies and threshold values from GSU which are appended and transformed into a Subsession-Decision-Info AVP. Monitoring-Key is locally generated using parameters viz. OCS-Name, Gy-Session-ID, SI and RG. PCNE 60 then sends CCA-I over an S9 interface back to Visited network PCFR 50. PCRF 50 responds to PCNE 60 with S9-CCR-U Subsession-Enforcement-Info AVP containing Usage Monitoring-Info AVP on threshold expiry. The triage is USAGE REPORT. PCNE 60 processes usage volumes from the Usage-Monitoring-Information AVP which are transformed into Gy USUs AVP. PCNE 60 then send Gy-CCR-U (including USUs with a Threshold-Expiry trigger) to OCS 30. OCS 30 responds back to PCNE 60 with Gy-CCA-U including GSUs for respective MSCC's. The PCNE 60 transforms Gy GSU in Usage-Monitoring-Information AVP and then send CCA-U Usage-Monitoring Information over the S9 interface to Visiting network PCFR 50.

The PCNE Entity can be configured to function as a centralized system for controlling subscriber experience depending upon preferred roaming partners. For example, if the wholesale cost for an inbound roaming subscriber of an Operator A and an Operator C in a specific location is $X/MB and $Y/MB respectively where $X>$Y, then Operator B (the Home Network operator) can define such policies that when a subscriber roams in Operator C's network, then the subscriber would receive better speed and bandwidth compared to Operator A.

In an embodiment of the invention, PCNE Entity can be configured to transform and negotiate policies from concerned network operators and apply and enforce a single negotiated policy for achieving consistent subscriber experience and charging, while enforcing the terms agreed between respective operators. The PCNE Entity can reduce overall traffic latency by offloading the data to preferred Packet data gateway.

The PCNE Entity can be configured to enforce policies in real-time on data traffic by functioning as a cloud-hosted PCRF and OCS node that can categorize the traffic based on VPLMN, HPLMN, IMSI Prefix, MSISDN-Prefix, Profile, Priority and APN.

In another embodiment PCNE Entity can be deployed for 5G networks among 5G nodes such as AMF, SMF, UPF, PCF and CHF to serve similar functionality as defined in current application for 3G and 4G networks.

Software and Hardware Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

Glossary of Claim Terms

Access Point Name (APN) refers to a gateway between a GSM, GPRS, 3G or 4G mobile network and another computer network, frequently the public Internet. The APN identifies the packet data network (PDN) that a mobile data user wants to communicate with. In addition to identifying a PDN, an APN may also be used to define the type of service.

Attribute Value Pair (AVP) means an information element of a Diameter Protocol message. Each Diameter message will contain multiple AVPs, such as Destination-Host AVP, Subscription ID AVP, Server-Name AVP, Framed IP Address AVP and the like.

Credit Control Answer (CCA) is a Diameter Protocol message used to carry a rule between the PCRF and the PCEF as part of the Policy Charging Control (PCC) framework.

Credit Control Request (CCR) is a Diameter Protocol message used by the PCEF to request a rule from the PCRF as part of the PCC framework.

Diameter is an authentication, authorization, and accounting protocol for computer networks.

Fifth Generation Network (5G) means the fifth-generation cellular network technology. It follows 2G, 3G and 4G and their associated technologies (such as GSM, UMTS, LTE, LTE Advanced Pro and others).

Gateway GPRS support node (GGSN) is the main component of the GPRS network and tasked with connecting the GPRS network with external packet switched networks (e.g., Internet or X.25). The GGSN is the anchor point that supports the mobility of the user terminal in the GPRS/UMTS networks. It is the GPRS equivalent to the home agent in Mobile IP. The GGSN maintains routing needed to tunnel the protocol data units (PDUs) to the SGSN that services a particular mobile station (MS).

Global System for Mobile Communication (GSM) means a wireless telecommunications standard for digital cellular services. It was developed by the European Telecommunications Standards Institute (ETSI) to describe the protocols for second-generation (2G) digital cellular networks used by mobile devices such as mobile phones and tablets.

General Packet Radio Service (GPRS) is a packet oriented mobile data standard on the 2G and 3G cellular communication network's global system for mobile communications (GSM).

GPRS Mobility Management (GMM) tracks where the subscribers are, allowing calls, SMS and other mobile phone services to be delivered to them.

GPRS Tunneling Protocol (GTP) is defined by 3GPP standards to carry General Packet Radio Service (GPRS) within 3G/4G networks.

GTP-C means a protocol within GTP for signaling between gateway GPRS support nodes (GGSN) and serving GPRS support nodes (SGSN). This allows the SGSN to activate a session on a user's behalf (PDP context activation), to deactivate the same session, to adjust quality of service parameters, or to update a session for a subscriber who has just arrived from another SGSN. The control plane protocol GTP-C(Control) uses registered port 2123.

GTP-U means GTP user plane which is used for carrying user data within the GPRS network and between the core network and radio access network. The transport of user data in GTP-U is packetized in formats such as IPv4, IPv6 and PPP. The user plane protocol GTP-U uses registered port 2152.

Gp is an interface interconnects a GGSN and SGSN that are located on different networks. The Gp interface includes security functionality based on agreement between the interconnected operators of the two respective networks.

Granted Service Unit (GSU) is an AVP in the Diameter protocol. The GSU contains the number of units that the Diameter credit-control client can provide to the end user until the service must be released or the new Credit Control Request (CCR) must be sent.

Gx is an interface operable within the Diameter Protocol and is located between Policy Charging Rules Function (PCRF) and the Policy Charging Enforcement Function (PCEF). The Gx interface is used for provisioning and removal of Policy and Charging Control (PCC) rules from the PCRF to the PCEF and the transmission of traffic plane events from the PCEF to the PCRF. The Gx interface can further be deployed for an application's traffic control and detection.

Gy is an interface operable within the Diameter Protocol and resides between the OCS and the PCEF. It enables online credit control for service data flow-based charging. The PCEF retrieves credits from OCS through the Gy interface.

HLR means Home Location Register which is a database that contains subscription data about subscribers authorized to use the GSM core network. The HLRs store details of every SIM card issued by the mobile phone operator.

Home Network means the network a mobile device subscriber is registered with.

Home Public Land Mobile Network (HPLMN) means the network in which a mobile subscriber's profile is held. Mobile users that roam on other networks (visiting) receive subscription information from the HPLMN.

HSS means Home Subscriber Service which implements HLR and Diameter signaling. The HSS is a central database that contains user-related and subscription-related information. The functions of the HSS include functionalities such as mobility management, call and session establishment support, user authentication and access authorization. The HSS is used in IMS and 4G while HLR is used in 2G and 3G.

HPMN means Home Public Mobile Network. The HPMN is the network from the operator by which a mobile subscriber has a subscription. The term is used in contrast to visited public mobile network (VPMN) which relates to roaming.

IMS means IP Multimedia Subsystem, an architectural framework to standardize the delivery of voice and other multimedia services of IP packet-switched networks.

IMSI means International Mobile Subscriber Identity. It is a specification used to uniquely identify a subscriber to a mobile telephone service. It is used internally to a GSM network and is adopted on nearly all cellular networks. The IMSI is a 50-bit field which identifies the phone's home country and carrier and is usually fifteen digits. This 15-digit number has two parts. The first part is comprised of six digits in the North American standard and five digits in the European standard. It identifies the GSM network operator in a specific country where the subscriber holds an account. The second part is allocated by the network operator to uniquely identify the subscriber. For GSM, UMTS and LTE network, this number is provisioned in the SIM card and for CDMA2000 in the phone directly or in the R-UIM card (the CDMA2000 analogue to a SIM card for GSM).

Latency means the delay in data communications over a network. Latency is the wait time introduced by the data signal travelling the geographical distance as well as over the various pieces of communications equipment. Latency may be attributable to various factors including, but not limited to, signal propagation, transmission mediums, processing of packets and storage delays.

Long-Term Evolution (LTE) is a standard for wireless broadband communication for mobile devices and data terminals, based on the GSM/EDGE and UMTS/HSPA technologies.

Mobile application part (MAP) is an SS7 protocol used to access the home location register (HLR), visitor location register (VLR), mobile switching center and other components of a mobile network infrastructure.

Mobile device is a portable computing device connected to a wireless network such as a cellular phone, smart phone, or tablet device.

Multiple Services Credit Control (MSCC) means a grouped AVP related to the independent credit control of multiple service features.

MSISDN means Mobile Station International Subscriber Directory Number which is provisioned to a mobile device subscriber for making calls. It is the mapping of the telephone number to the SIM card (or CDMA2000 directly in the hardware) in a mobile or cellular phone and is the number normally dialed to connect a call to the mobile device. A SIM card has a unique IMSI that does not change but the MSISDN can change in time (e.g., telephone number portability).

Multiple Services Credit Control (MSCC) relates to real-time credit control for a plurality of end user services within the Diameter protocol. MSCC allows charging across multiple rating groups in a single Diameter session.

Online charging system (OCS) refers to a system allowing a communications service provider to charge customers, in real time, based on service usage. Charging may be executed response to events and/or sessions.

Packet Data Network Gateway (PGW) provides connectivity from the user equipment (UE) to external packet data networks by being the point of exit and entry of traffic for the UE. The PGW enacts policy enforcement, packet filtering for users, charging support and lawful interception as well as packet screening.

Packet Data Protocol (PDP) means a network protocol used by packet switching external networks to communicate with GPRS (General Packet Radio Services) networks. The PDP data structure exists on both the SGSN (Service GPRS Support Node) and the GGSN (gateway GPRS support node) that contains the mobile subscriber's session information while the session is active. When a mobile subscriber seeks to use GPRS, it must first attach and activate a PDP context. This assigns a PDP context data structure in the SGSN that the subscriber is visiting and the GGSN serving the subscriber's access point.

Parse means to search, separate or extract a subset of data from a first value to arrive at a second value. This may include fix-field extraction based on alphanumeric character position, searching for character strings or delimitators, or other form of syntax analysis.

Peer Network means a network accessible without traversing a centralized server.

Policy Charging Control (PCC) means architecture specified by the 3GPP to enable packets flowing through an IP-CAN associated with a charging key for online and offline billing. PCC also provides policy control, in which a PCRF (Policy Control and Charging Rules Function) interacts with a PCEF (Policy Charging and Control Enforcement Function) to provide instruction on the control of the IP-CAN. PCC is a technique which can be used within the IMS to provide policy and charging control between IMS entities (namely the P-CSCF) and the IP-CAN.

Policy Charging Negotiation and Enforcement Entity (PCNE Entity) means a virtualized policy, charging, negotiation and enforcement application for serving cellular traffic across multiple networks. PCNE Entity manages signaling and user payloads in such a manner that policies compliant to concerned networks are applied in real time.

Policy and Charging Rules Function (PCRF) is the software node designated in real-time that supports service data flow detection, policy enforcement and flow-based charging.

Preemption capability information (PCI) determines whether a bearer with a lower priority level (PL) should be dropped to free up the required resources.

Preemption vulnerability information (PVI) determines whether a bearer is a candidate for dropping by another preemption capable bearer with a higher priority level (PL) value.

Priority level information (PL) defines the allocation and retention priority of the bearer in quality of service (QoS) systems.

Proxy means a server (a computer system or an application) that acts as an intermediary for requests from clients seeking resources from other servers.

Quality of Service (QoS) Class Identifier (QCI) means a referenced used to access node-specific parameters that control bearer-level packet forwarding handling that have been pre-configured by the operator owning the base station (evolved node B or eNB). The parameters may include queue management limits, admission thresholds, scheduling weights, link layer protocol settings and the like.

Requested Service Unit (RSU) is an AVP in the Diameter protocol. It may contain the amount of requested service units or the requested monetary value.

S5 is an interface used within the evolved packet core (EPC) for LTE networks. The S5 interface exists between the serving gateway (SGW) and the packet data network gateway (PGW) when internal to a network (e.g., non-roaming).

S8 is an interface used within the evolved packet core (EPC) for LTE networks. The S8 interface exists between the serving gateway (SGW) and the packet data network gateway (PGW) when roaming between different operators.

S9 is an interface within the Diameter Protocol and serves as a roaming interface between the PCRF in a home network controlling the policies to be applied in the visited network through the visiting network's PCRF.

Service ID (SI) is an AVP within the Diameter protocol.

Serving GPRS Support Node (SGSN) is a main component of the GPRS network, which handles all packet switched data within the network, e.g. the mobility management and authentication of the users. The SGSN keeps track of the location of an individual mobile subscriber and performs security functions and access control.

Serving Gateway (SGW) routes and forwards user data packets. The SGW manages and stores UE contexts, e.g. parameters of the IP bearer service, network internal routing information.

Serving Node means a SGSN or SGW connection point in a GPRS network or a SMF or UPF node in a 5G network.

Session Management Function (SMF) is a 5G function that performs the session management functions that are handled by the 4G MME, SGW-C, and PGW-C.

SIM (subscriber identity module) is an integrated circuit that stores the IMSI number, its related key and additional data.

Signaling System 7 (SS7) refers to a dedicated 64 kilobit data circuit to carry packetized messages about each call connected between machines of a network to achieve connection control.

Signal Transfer Point (STP) is a router that relays SS7 messages.

Mobile Telecommunications System (UMTS) is one of the third generation (3G) mobile telecommunications systems. It is a broadband, packet-based transmission of text, digitized voice, video, and multimedia at data rates up to 2 megabits per second (Mbps).

Universal Mobile Telecommunications System (UMTS) is a third-generation mobile cellular system for networks based on the GSM standard.

Used Service Unit (USU) is an AVP in the Diameter protocol. The USU contains the number of used units measured from the point when the service became active or, if interim interrogations are used during the session, from the point when the previous measurement ended.

User Equipment (UE) means a mobile device connectable to a cellular telecommunications network.

User Plane Function (UPF) is a function in a 5G network. The UPF performs packet routing and forwarding. It also performs packet inspection, QoS handling connects to the Internet POP (point of presence).

Visitor Location Register (VLR) means a database storing data about mobile phones that recently joined a particular area of a mobile operator's network. The VLR keeps track of roamed mobile phone subscribers and communications with the HLR to determine whether the mobile phone is a permanent or temporary subscriber.

Visited Network means the network a mobile device subscriber roams temporarily and is outside the bounds of the home network.

Visited Public Land Mobile Network (VPLMN) means a network that a mobile subscriber roams on when leaving their Home Public Land Mobile Network (HPLMN).

While methods, apparatuses, and systems have been described in connection with exemplary embodiments of the various figures, it is to be understood that other similar embodiments can be used, or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method for negotiating and enforcing policies and charging for cellular traffic across multiple networks, comprising:

establishing a first diameter protocol data signaling connection between a policy charging negotiation and enforcement entity (PCNE) with a first network operator and a second diameter protocol data signaling connection between the PCNE and a second network operator;

processing on the PCNE the policies received from the first network operator, the second network operator and a locally configured static policy stored in a database communicatively coupled to the PCNE to derive a single negotiated policy to be applied on subscriber traffic;

the PCNE transforming Gy attributes received from the first network into S9 attributes towards the second network to apply online charging system (OCS) based charging policies of the first network; and the PCNE enforcing the single negotiated policy in real-time on subscriber traffic.

2. The method of claim 1, wherein local policies and priorities related to subscribers, operators and inter-operator terms and conditions are stored in a static policy database.

3. The method of claim 1, wherein a general packet radio service (GPRS) tunneling protocol control plane (GTP-C) module is used to validate and forward GPRS tunneling protocol (GTP) signaling messages.

4. The method of claim 1, wherein a GPRS tunneling protocol user plane (GTP-U) module is used to validate and forward GTP user data.

5. The method of claim 1, wherein a Gx module is used to manage Gx interface related messages and attributes and store Gx session specific information.

6. The method of claim 1, wherein a Gy module is used to manage Gy interface related messages and attributes and store Gy session specific information.

7. The method of claim 1, wherein a S9 module is used to manage S9 interface related messages and attributes and store S9 session specific information.

8. The method of claim 1, wherein a Gy to S9 transformer module is used to transform charging policies received over Gy interface from a home network OCS into S9 charging policies to be communicated to visited policy charging rules function (PCRF) in a Visited-Access roaming model, wherein the charging policies are applied to inbound roaming traffic in real-time by a visited packet data network gateway (PGW).

9. The method of claim 5, wherein, in a Home-Routed Access roaming model, the Gx module is used to retrieve polices over Gx interface from a visited policy charging rules function (PCRF) system, and a S9 module is used to retrieve policies from a home PCRF system, wherein policies obtained from both the visited PCRF system and the home PCRF system are communicated to a policy negotiator module to derive the single negotiated policy.

10. The method of claim 9, wherein the policy negotiator module is used to process and negotiate policies received from the visited PCRF system and the home PCRF System to derive the single negotiated policy to prevent overuse and enforce roaming agreements.

11. The method of claim 10, wherein a policy enforcer module is used to enforce the single negotiated policy onto signaling and user traffic to optimize bandwidth and resources of the visited network and the home network, whereby a visited network operator and a home network operator have joint control over roaming policies and restrictions.

12. The method of claim 2, wherein the static policy database is used to locally configure, and store policies and priorities related to subscribers and network operators.

13. The method of claim 3, wherein the GTP-C module is used to enforce the policies onto GTP signaling traffic and steer the traffic towards a selected PGW, the GTP-C module being configured to decide whether to handle GTP user traffic or to create a direct tunnel between serving gateway (SGW) and the PGW wherein a GTP-U module is used to handle GTP user traffic and apply negotiated subscriber policies to mirror, steer, block or redirect the GTP user traffic.

14. The method of claim 1, wherein a home network implements domestic quota buckets while a subscriber is roaming in a visited network by applying differential policy and charging based on parameters selected from the group consisting of visited country, visited network, zone, international mobile subscriber identity (IMSI) prefix, mobile station international subscriber directory number (MSISDN) prefix, user profile and access point name (APN).

15. The method of claim 8, wherein the Gy to S9 transformer module is used to maintain inter-mapping between Gy and S9 attributes to apprehend, modify, and transform policies and attributes in real-time.

16. The method of claim 1, wherein a conflict resolver module is used to resolve the conflict among contradictory polices received from the first network, the second networks, and a static policy database using conflict resolution techniques defined in the static policy database or a subscriber and operator profile.

17. The method of claim 2, wherein the static policy database stores local policies based on parameters selected from the group consisting of international mobile subscriber identity IMSI prefix, mobile station international subscriber directory number MSISDN prefix, visited public land mobile network (VPLMN), access point name APN, serving network, current user location information, zone, preferred roaming partner, access type, order, priority, applicability and conflict-resolution schemes.

18. A method for negotiating and enforcing policies and charging for cellular traffic across multiple networks in a Visited-Access roaming model, the method comprising the steps of:
  processing the policies received from a home network operator, a visited network operator and a locally configured static policy to derive a single negotiated policy to be applied on subscriber traffic;
  transforming Gy attributes received from the home network into S9 attributes towards the visited network to apply online charging system (OCS) based charging policies of the home network; and
  enforcing the single negotiated policy in real-time on inbound roaming traffic by a visited packet data network gateway (PGW).

19. A method for negotiating and enforcing policies and charging for cellular traffic across multiple networks in a Home-Access roaming model, the method comprising the steps of:
  processing the policies received from a home network operator, a visited network operator and a locally configured static policy to derive a single negotiated policy to be applied on subscriber traffic;
  providing a Gx module used to manage Gx interface related messages and attributes and store Gx session specific information;
  retrieving policies over a Gx interface with the Gx module from a first policy charging rules function (PCRF) on the visited network;
  retrieving policies over an S9 interface with an S9 module from a second PCRF on the home network, wherein policies obtained from both the visited PCRF system and the home PCRF system are communicated to a policy negotiator module to derive the single negotiated policy; and
  enforcing the single negotiated policy.

* * * * *